United States Patent [19]

Dirkin et al.

[11] Patent Number: 4,697,499
[45] Date of Patent: Oct. 6, 1987

[54] DUAL TANDEM COMPOSITE CYLINDER ASSEMBLY

[75] Inventors: William Dirkin, Portage; Duane Douglass, Vicksburg; James N. Tootle; Terry L. Benton, both of Portage, all of Mich.

[73] Assignee: Pneumo Corporation, Boston, Mass.

[21] Appl. No.: 642,539

[22] Filed: Aug. 20, 1984

[51] Int. Cl.⁴ .............................................. F01B 7/04
[52] U.S. Cl. ...................................... 92/151; 92/170; 92/171
[58] Field of Search ................ 92/151, 146, 161, 150, 92/169.1, 169.2, 59, 170, 171; 220/415, 414, 3, 4 B, 4 C, 4 E; 138/129

[56] References Cited

U.S. PATENT DOCUMENTS

| | | | |
|---|---|---|---|
| 2,744,043 | 5/1956 | Ramberg | 220/83 X |
| 3,074,585 | 1/1963 | Koontz | 220/83 X |
| 3,079,038 | 2/1963 | Rossi et al. | 220/83 |
| 3,171,563 | 3/1965 | Bernd | 220/3 |
| 3,334,773 | 8/1967 | Bimba | 220/3 X |
| 3,783,620 | 1/1974 | Moe | 92/151 X |
| 4,039,006 | 8/1977 | Inoue et al. | 138/129 |
| 4,300,439 | 11/1981 | Degnan et al. | 92/171 X |
| 4,315,454 | 2/1982 | Knödel | 92/170 |
| 4,449,446 | 5/1984 | Degnan et al. | 92/171 X |
| 4,495,772 | 1/1985 | Furuta et al. | 92/171 X |

FOREIGN PATENT DOCUMENTS 3027267 2/1982 Fed. Rep. of Germany ........ 92/169

Primary Examiner—Abraham Hershkovitz
Assistant Examiner—Mark A. Williamson
Attorney, Agent, or Firm—Renner, Otto, Boisselle & Lyon

[57] ABSTRACT

Dual tandem composite cylinder assembly includes a cylinder having circumferential or hoop stress windings surrounding a pair of hydraulic chambers in series to react the circumferential loads and prevent diametrical expansion of the hydraulic chambers. Longitudinal tension windings extend over substantially the entire length of the cylinder outwardly of the circumferential windings to react the axial loads which the cylinder must contain. Compressive cylinder composite windings are also provided for carrying compressive loads generated within the cylinder. The hydraulic chambers are desirably lined with removable liner members to facilitate changing of seals and refurbishment of the cylinder.

27 Claims, 6 Drawing Figures

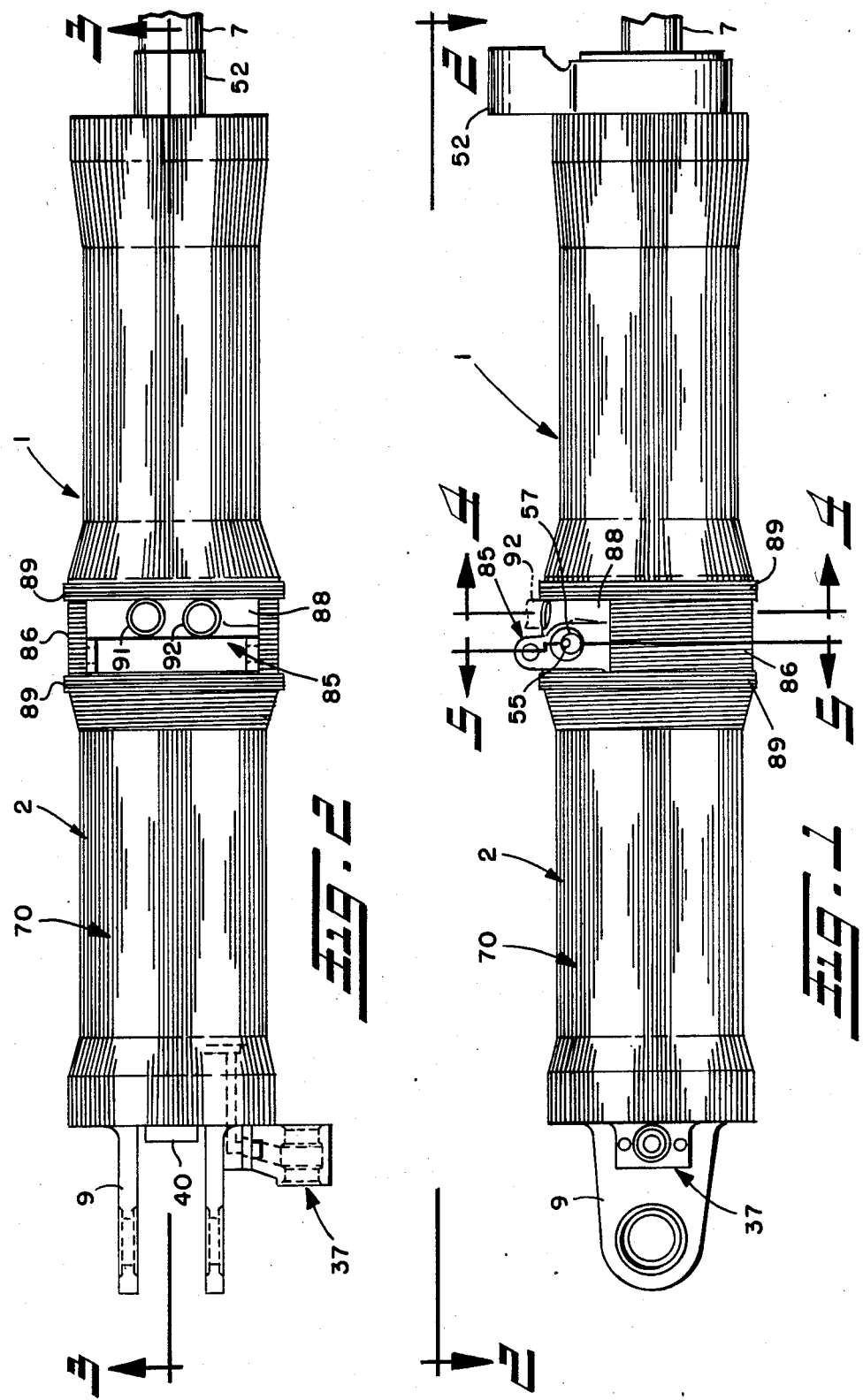

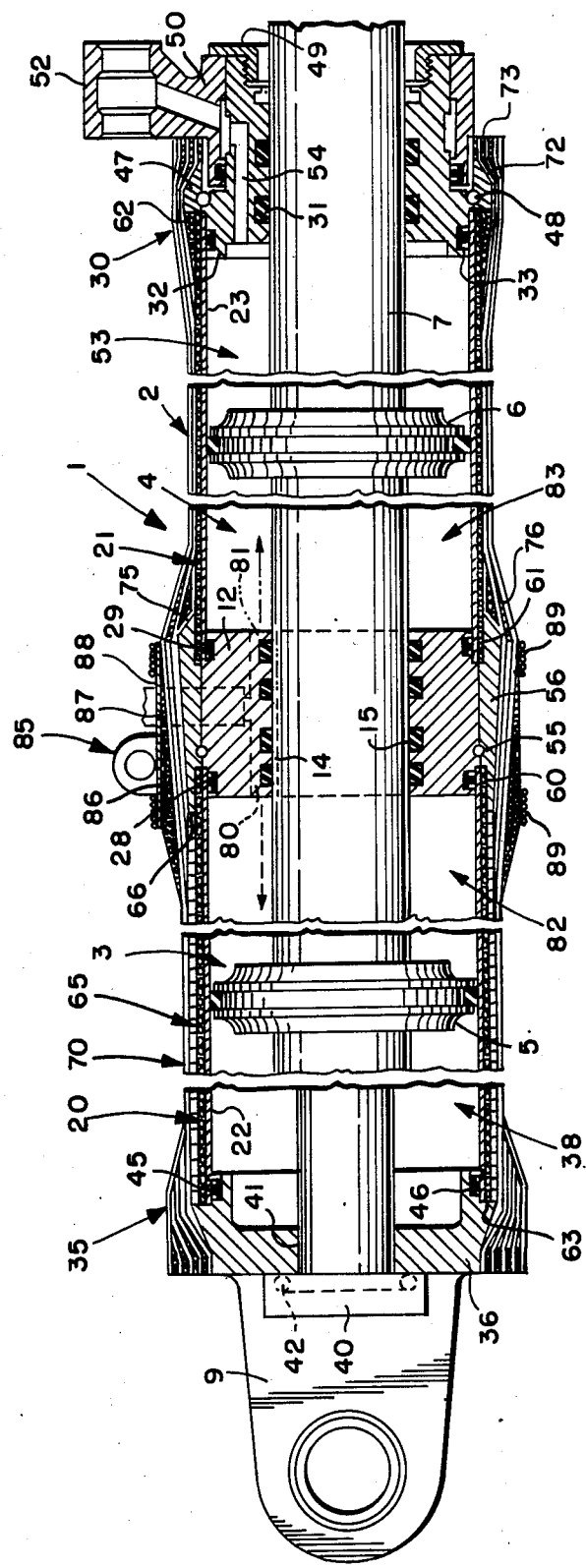

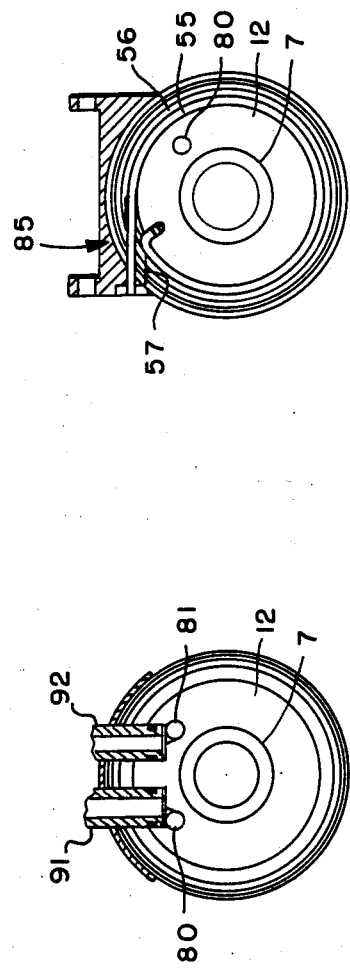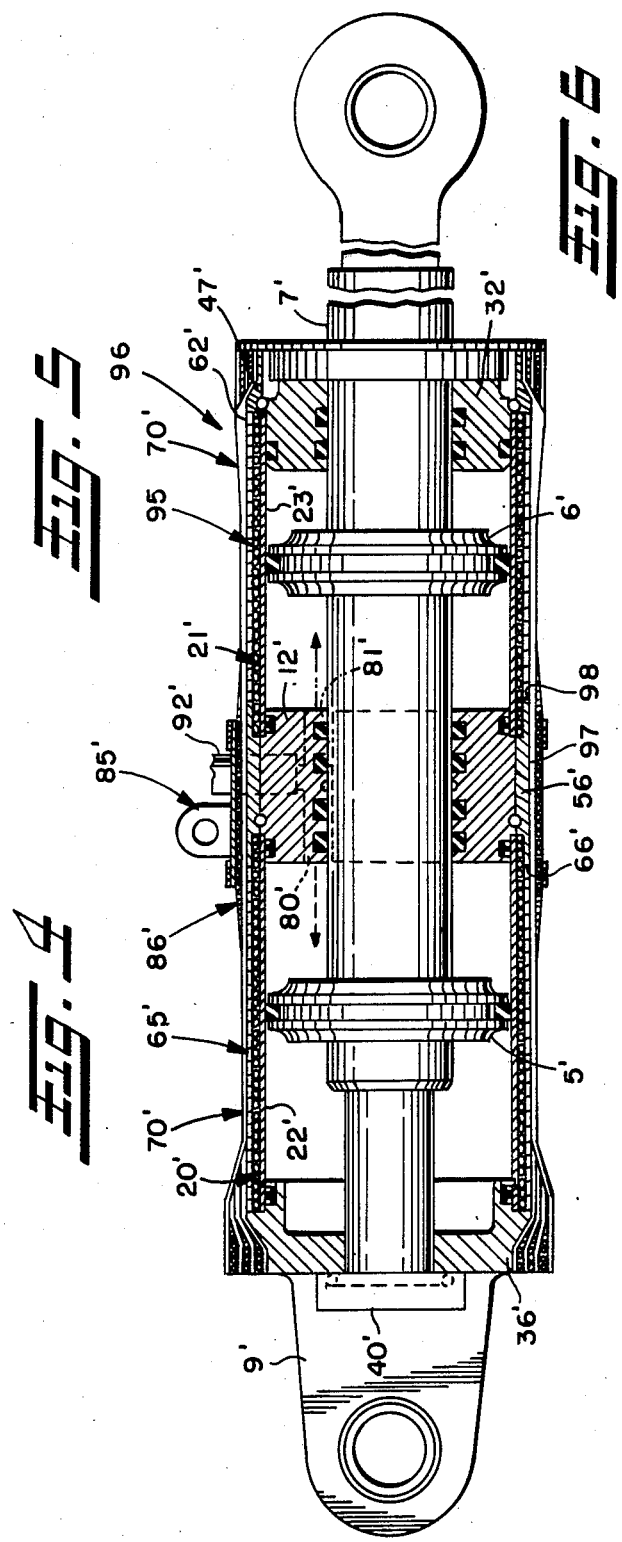

DUAL TANDEM COMPOSITE CYLINDER ASSEMBLY

BACKGROUND OF THE INVENTION

This invention relates generally, as indicated, to a dual tandem composite cylinder assembly which permits a substantial reduction in the weight of the cylinder without sacrificing strength.

Dual tandem cylinder assemblies are oftentimes used in flight controls for aircraft and similar type applications where system redundancy is important. Typically, such a dual tandem cylinder assembly comprises a pair of hydraulic chambers in series having respective pistons connected to a common ram output rod for common movement therewith. In service, the two chambers may be used in tandem, or indepenently, to extend or retract the rod, or to provide a compressive or tension load within the cylinder assembly.

Heretofore, in order to ensure that the cylinder assembly had the necessary strength and because of manufacturing considerations, it was the usual practice to make the cylinder out of a monolithic metal piece, which not only added considerably to the weight of the cylinder assembly in the highly stressed areas, but also in the relatively unstressed areas as well.

SUMMARY OF THE INVENTION

In accordance with one aspect of the invention, the dual tandem cylinder assembly utilizes a directional composite hydraulic cylinder construction which provides an extremely light weight, low cost, envelope efficient design.

More particularly, circumferential or hoop stress windings are provided around a pair of hydraulic chambers in series to react the circumferential loads and prevent diametrical expansion of the hydraulic chambers.

Also in accordance with the invention, longitudinal tension windings extend over substantially the entire length of the cylinder outwardly of the circumferential windings to react the axial loads which the cylinder must contain.

Further in accordance with the invention, compressive load windings may be provided to carry compressive loads generated in the cylinder.

Also in accordance with the invention, removable end and center glands and liners are desirably provided to facilitate changing of seals and refurbishment of the cylinder.

Further in accordance with the invention, the directional composite hydraulic cylinder construction provides for increased strength, durability and damage tolerance, and is also ballistically tolerant.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a side elevation view of a preferred form of dual tandem composite cylinder assembly in accordance with this invention;

FIG. 2 is a top plan view of the cylinder assembly of FIG. 1 as seen from the plane of the line 2—2 thereof;

FIG. 3 is an enlarged fragmentary longitudinal section through the cylinder assembly of FIG. 2, taken on the plane of the line 3—3 thereof;

FIGS. 4 and 5 are fragmentary transverse sections through the cylinder assembly of FIG. 1, taken on the plane of the lines 4—4 and 5—5, respectively; and FIG. 6 is a fragmentary longitudinal section through another form of dual tandem composite cylinder assembly in accordance with this invention.

DETAILED DESCRIPTION OF THE PREFERRED EMBODIMENTS

Referring now in detail to the drawings, and initially to FIGS. 1-3, there is shown one form of dual tandem composite cylinder assembly 1 in accordance with this invention, which generally comprises a cylinder body 2 containing a pair of hydraulic chambers 3, 4 in series and having respective pistons 5, 6 connected to a common ram output rod 7 for common movement therewith. In service, the two chambers 3, 4 may be used in tandem, or independently, to extend or retract the rod, or provide a compressive or tension load. The outermost end of the rod 7 is adapted to be attached to a movable part to be actuated, whereas the inboard end of the cylinder has a suitable mount such as a clevis attachment 9 connected thereto for attaching the cylinder body to the stationary part of the device to be actuated.

As described in more detail hereafter, the hydraulic cylinder 2 utilizes directional composites which allow for separation of load paths, including circumferential or hoop stress windings to react the circumferential loads, longitudinal windings to react the axial loads which the cylinder must contain, and compressive load windings to carry compressive loads generated in the cylinder.

As clearly shown in FIG. 3, the two hydraulic chambers 3, 4 (which are hereafter referred to as the head end chamber and rod end chamber, respectively) are separated by a center gland or dam 12 having a central opening 14 therethrough for the output rod 7, with suitable seals 15 therebetween.

In accordance with one aspect of the invention, the cylinder 2, rather than being made of the usual monolithic steel construction, is of a composite construction as aforesaid including separate circumferential or hoop stress windings 20, 21 surrounding the respective hydraulic chambers 3, 4 which react the circumferential loads generated in each chamber. The hoop stress windings 20, 21 are desirably made of a suitable composite fiber such as a high modulus graphite filament wound fiber which has a relatively high tensile strength to weight ratio to carry the hoop loads and prevent diametrical expansion of the cylinder when high pressure fluid is admitted to either end of each chamber during extension and retraction of the rod. The fibers are impregnated with a suitable resin such as epoxy, polyester, polyimide, etc.

Each hydraulic chamber 3, 4 is also desirably lined with a sealing, wear resistant liner member 22, 23 which defines the inner wall of the respective hydraulic chamber. The liner members are preferably of relatively small thickness and are preferably made of a relatively light weight metal such as aluminum which acts as a barrier to the hydraulic fluid, sealing the hydraulic fluid within the hydraulic chambers. The liner members may also be made of other materials such as wear resistant plastics or stainless steel if desired. Moreover, in certain applications the liner members may be eliminated altogether.

Each of the liner members 22, 23 is desirably formed as a separate piece completely independent of the various other parts of the assembly, for a purpose to be subsequently described. The ends of the liner members nearest each other and circumferential windings surrounding same extend over a portion of the exterior length of the opposite ends of the center gland 12, with suitable seals 28, 29 between the center gland and each liner member to prevent fluid leakage therepast.

Attached to the rod end 30 of the cylinder 2 is an end wall or gland 32 through which the rod 7 extends, with cylinder seals 31 therebetween. The outboard end of the liner member 23 surrounding the rod end chamber 4 and hoop stress windings 21 thereabout extend over a portion of the exterior length of the end gland 32, with suitable seals 33 between the end gland and liner member 23.

At the head end 35 of the cylinder 2 is a metal end wall or fitting 36 which provides a closure for the head end chamber 3. Attached to the head end fitting 36 is a suitable attachment for the cylinder which could be a clevis attachment 9 as shown or a simple bearing, etc. The head end fitting 36 may also include suitable porting 37 (see FIGS. 1 and 2) to the head end extend chamber 38 (FIG. 3) as well as any internal position feedback electronics as may be required for monitoring the position of the ram output rod 7. In the embodiments disclosed herein, a position transducer or sensor 40 is shown extending through a central aperture 41 in the head end fitting 36 into the inboard end of the hollow output rod 7, with suitable seals 42 between the sensor 40 and fitting 36 to prevent fluid leakage through the opening 41.

Adjacent the axial inner end of the fitting 36 is a cylindrical surface 45 over which the inboard end of the liner member 22 surrounding the head end chamber 3 and circumferential windings 20 wrapped therearound extend, with suitable seals 46 between the liner member and fitting.

The rod end gland 32 is retained at the outboard end of the rod end chamber 4 by connecting same to a metal end ring 47 which is incorporated into the composite cylinder structure as described hereafter. The metal end gland 32 may be secured to the metal end ring 47 in any suitable manner, for example, by a threaded connection or by means of a retaining wire 48 as shown. The retaining wire 48 may be removed by unscrewing a nut 49 in the outer end of the end gland 32 and removing an end plate 50 which prevents the end gland from being drawn into the rod end chamber 4 during retraction of the rod. The end plate 50 may include a retract pressure port 52 which communicates with the rod end retract chamber 53 through a passage 54 in the end gland 32. Removal of the retaining wire 48 permits removal of the metal end gland 32 for changing the seals 31 and 33 and also permits removal and replacement of the rod end liner 23 to provide for refurbishment of the rod end chamber.

Likewise, the center gland or dam 12 may be held in place by a retaining wire 55 which is seated in a metal center ring 56 incorporated into the composite cylinder structure as described hereafter. The retaining wire 55 for the center gland may be wound in through a hole 57 in the cylinder wall as shown in FIG. 5 and removed therefrom to permit removal of the center gland for changing the seals 15, 28, 29 and to permit removal and replacement or refurbishment of the head end liner member 22 and associated seals 46 between the head end fitting 36 and head end liner member. The provision of a removable liner member also has application to a single composite cylinder assembly to permit changing of seals and refurbishment of the cylinder liner member.

The center ring 56 desirably has an internal counterbore 60, 61 in opposite ends thereof for receipt of the adjacent ends of the respective liner members 22, 23 and circumferential windings 20, 21 surrounding same. Also, the rod end ring 47 has a shoulder 62 which extends radially outwardly beyond the adjacent end of the rod end liner member 23, and the rod end circumferential windings 21 desirably extend radially outwardly subtantially the full radial extent of the rod end ring shoulder 62 to eliminate any step therebetween as shown in FIG. 3.

The head end fitting 36 has a shoulder 63 which extends slightly radially outwardly beyond the adjacent end of the head end liner member 22 and surrounding circumferential windings 20 to provide a reaction surface for engagement by one end of compressive cylinder composite windings 65 wound on the outside of the head end circumferential windings 20 for a purpose to be subsequently described. The compressive cylinder composite windings 65 are wound from low angle helical fibers and extend from the shoulder 63 on the head end fitting 36 to an opposed end wall 66 in axial alignment therewith on the metal center ring 56 radially outwardly of the counterbore 60 therein.

Extending over substantially the entire length of the cylinder 2 radially outwardly of the compressive cylinder composite windings 65 surrounding the head end chamber 3 and radially outwardly of the circumferential windings 21 surrounding the rod end chamber 4 are one or more layers of longitudinal tension windings 70 which substantially completely cover the outer surface of the cylinder. These longitudinal tension windings are also desirably made of suitable composite fibers having the required high tensile strength to weight ratio such as high modulus graphite filament wound epoxy impregnated fibers which may be protected from handling damage by a thin layer of fiberglass reinforced composite. The rod end ring 47 desirably has an external tapered surface 72 facing outwardly of the rod end which is engaged by the outboard ends of the longitudinal tension windings 70 and attached thereto by circumferential windings 73 which are preferably interspersed between each layer of longitudinal tension windings as shown.

Likewise, the longitudinal tension windings 70 are desirably attached to the center ring 56 intermediate the ends of the longitudinal tension windings by providing an external tapered surface 75 on the metal center ring facing the rod end of the cylinder which is engaged by the longitudinal tension windings and attached thereto by circumferential windings 76 which are also desirably interspersed between each layer of longitudinal tension windings.

The center gland 12 desirably contains two isolated hydraulic pressure passages 80, 81 (see FIGS. 3 and 4). Passage 80 is for admitting (and venting) retract pressure to the head end retract chamber 82, whereas passage 81 is for admitting (and venting) extend pressure to the rod end extend chamber 83. Hydraulic pressure may be supplied to the passages 80, 81 through a hydraulic service manifold (not shown) which may be attached to the cylinder 2 using a manifold attachment 85 placed over the center dam area exteriorly of the longitudinal fibers 70. The outer cylinder wall may be built up in the region of the center dam area using circumferential windings 86 to provide a substantially cylindrical surface 87 for supporting the saddle portion 88 of the manifold attachment 85. Circumferential windings 89 are then desirably wound around opposite ends of the manifold attachment and cylinder wall in order to react any separation loads acting on the manifold attachment. Standpipes 91, 92 may be inserted into the passages 80, 81 from the exterior of the cylinder to facilitate making the connections to the hydraulic service manifold.

Of course, in order to allow for removal of the liner members and center gland and associated seals, the circumferential hoop stress windings and longitudinal tension windings as well as the compressive cylinder composite windings must be wound on a mandrel or other suitable device which also supports the end wall fitting 36 and center and end rings 56 and 47. The resulting assembly is then removed from the mandrel and placed in an oven and heated to a temperature sufficient to cause the windings to bond to each other.

Thereafter, the removable liner members and center gland and associated seals as well as the pistons 5, 6 and output rod 7 may be inserted into the assembly and the end gland 32 secured in place to complete the assembly.

In operation, when an extend pressure is admitted to the rod end extend chamber 83 through the associated pressure passage 81 in the center gland 12, such extend pressure in the rod end extend chamber is reacted into the center ring 56 surrounding the center gland 12 and the resulting reaction force creates a compression load that is transmitted to the head end fitting 36 through the compressive cylinder composite windings 65 on the outside of the head end circumferential windings 20 where it reacts against the head end fitting and clevis attachment 9 extending therefrom.

When a retract pressure is applied to the rod end retract chamber 82 through the pressure port 52, the reaction force which appears in the rod end gland 32 will be transferred from the rod end gland first to the rod end ring 47 and then to the longitudinal tension windings 70 which generates a tension load in the longitudinal tension windings that is reacted through these windings back to the head end fitting 36 and thus to the support structure to which the head end fitting is connected.

Similarly, when a retract pressure is applied to the head end retract chamber 82 through the associated pressure passage 80, such pressure is reacted to the center ring 56 surrounding the center gland 12 and is transferred to the longitudinal tension fibers 70 at the point of attachment of the longitudinal tension fibers 70 to the center ring by the circumferential windings 73 which generates a tension load in the longitudinal tension windings that is reacted back to the head end fitting 36.

Alternatively, additional compressive cylinder composite windings 95 may be provided on the outside of the rod end circumferential windings 21' of the modified form of dual tandem cylinder assembly 96 shown in FIG. 6 for transmitting a compression load from the center ring 56' to the rod end ring 47' which generates a tension load in the longitudinal tension fibers 70' at their point of attachment to the rod end ring. This will eliminate the need for having to provide a middle joint attachment between the longitudinal tension fibers 70' and center ring 56', which would be particularly applicable to a shorter dual tandem cylinder. In that event, the external tapered surface may be eliminated from the center ring 56', whereby the exterior surface 97 of the center ring 56' may be substantially cylindrical as further shown in FIG. 6. Also, the shoulder 62' on the rod end ring 47' of the dual tandem cylinder assembly 96 embodiment shown in FIG. 6 desirably extends slightly radially outwardly beyond the circumferential windings 21' to provide a reaction surface for engagement by one end of the compressive cylinder composite windings 95. The other end of the composite cylinder compressive windings 95 desirably engages an opposed end wall 98 on the center ring 56' in coaxial alignment therewith. Otherwise, the details of construction and operation of the dual tandem composite cylinder assembly 96 shown in FIG. 6 are substantially the same as those shown in FIGS. 1-5, and the same reference numerals followed by a prime symbol are used to designate like parts.

From the foregoing, it will be apparent that a dual tandem composite cylinder assembly constructed in accordance with the present invention provides a relative light weight, low cost, envelope efficient design which achieves strength and durability. Also, such a design allows for changing of the seals and removable liner members for refurbishment of the cylinder assembly.

In addition to the foregoing, ballistic tolerance of the dual tandem composite cylinder assembly is achieved through the frangibility of the composite cylinder structure. In a conventional metal dual tandem cylinder, a substantial metal burr will be raised through passage of a ballistic projectile through one of the hydraulic chambers. Thus, not only will the projectile incapacitate the hydraulic actuator system, such projectile will also cause the hydraulic piston rod to interfere and jam on the metal burr, which will defeat both of the redundant hydraulic systems.

A projectile passing through either of the hydraulic chambers of the present invention, on the other hand, will not raise a metal burr in the composite cylinder. Rather, such projectile will leave multitudes of "loose ends" created by the projectile passing through the windings of fiber material. These loose ends are easily sheared off by the force available from the other hydraulic system, thus preventing a jam of the other hydraulic system. Moreover, even when the dual tandem composite cylinder assembly includes metal liner members, the burr that is created by a projectile passing through one of the liner members would still be relatively easily sheared off by the associated piston and would not impede piston movement caused by the force available from the other hydraulic system.

The relative superior damage tolerance aspects of directional composite windings will also generally guarantee an adequate residual load path after there has been ballistic damage to one of the hydraulic chambers. A rupture or tear through one of the chamber walls will normally be radial. Accordingly, the circumferential hoop stress windings will normally prevent the tear or rupture from traveling radially outward, whereby the cylinder assembly will still be capable of transmitting axial tension loads.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

The embodiments of the invention in which an exclusive property or privilege is claimed are defined as follows:

1. A dual tandem composite cylinder assembly comprising a cylinder including a pair of hydraulic chambers in series, said hydraulic chambers having end wall members at the opposite ends of said cylinder and a center gland therebetween, said hydraulic chambers having respective separate first and second circumferential hoop stress windings surrounding same, said first circumferential windings extending axially between opposed surfaces on one of said end wall members and one end of said center gland, and said second circumferential windings extending axially between opposed surfaces on the other of said end wall members and the other end of said center gland, longitudinal tension windings extending substantially the entire length of said cylinder outwardly of said first and second circumferential windings and said center gland and substantially completely covering said first and second circumferential windings and said center gland and said pair of hydraulic chambers therebeneath, and securing means for securing the opposite ends of said longitudinal tension windings to said end wall members at said opposite ends of said cylinder.

2. The assembly of claim 1 wherein said end wall members have external tapered surfaces facing in opposite directions for engagement by the opposite ends of said longitudinal tension windings, and said securing means comprises means for affixing said longitudinal tension windings to said external tapered surfaces on the respective end wall members.

3. The assembly of claim 1 further comprising attachment means for attaching said center gland to said longitudinal tension windings intermediate the ends of said longitudinal tension windings, whereby a hydraulic force acting on said center gland urging said center gland away from one of said end wall members will be transferred to said longitudinal tension windings at the point of attachment of said longitudinal tension windings to said center gland and be reacted back to said one end wall member through said longitudinal tension windings.

4. The assembly of claim 1 further comprising separate liner members lining each of said hydraulic chambers radially inwardly of each of the respective circumferential windings, and seal means between said end wall members and center gland and the opposite ends of said liner members providing direct sealing engagement between the opposite ends of said liner members and said end wall members and center gland, respectively.

5. The assembly of claim 4 wherein said liner members are removable to permit refurbishment of said cylinder.

6. A composite cylinder assembly comprising a cylinder containing a hydraulic chamber having end wall members at opposite ends thereof, said hydraulic chamber having circumferential hoop stress windings surrounding same, a separate liner member lining said hydraulic chamber radially inwardly of said circumferential windings, seal means providing direct sealing engagement between said end wall members and the opposite ends of said liner member at opposite ends of said hydraulic chamber, said circumferential windings and liner member extending axially between opposed surfaces on said end wall members and axially beyond said seal means at said opposite ends of said hydraulic chamber, longitudinal tension windings extending substantially the entire length of said cylinder radially outwardly of said circumferential windings and substantially completely covering said circumferential windings and said hydraulic chamber therebeneath, and securing means for securing the opposite ends of said longitudinal tension windings to said end wall members at said opposite ends of said cylinder axially beyond the opposite ends of said circumferential windings and liner member.

7. The assembly of claim 6 wherein said liner member is removable to permit refurbishment of said cylinder.

8. The assembly of claim 6 further comprising means for removably attaching one of said end wall members at one end of said cylinder to permit removal of said one end wall member therefrom for removal and refurbishment of said liner member and replacement of the associated seals.

9. The assembly of claim 6 wherein said end wall members have external tapered surfaces facing in opposite directions for engagement by the opposite ends of said longitudinal tension windings, and said securing means comprises means for affixing said longitudinal tension windings to said external tapered surfaces on the respective end wall members.

10. A dual tandem composite cylinder assembly comprising a cylinder including a pair of hydraulic chambers in series, said hydraulic chambers having end wall members at the opposite ends of said cylinder and a center gland therebetween, each said hydraulic chamber having separate circumferential hoop stress windings surrounding same, longitudinal tension windings extending substantially the entire length of said cylinder outwardly of said circumferential windings and substantially completely covering said circumferential windings and said hydraulic chambers therebeneath, securing means for securing the opposite ends of said longitudinal tension windings to said end wall members at opposite ends of said cylinder, and compressive cylinder composite windings located between said longitudinal tension windings and one of said circumferential windings, said compressive cylinder composite windings extending axially between opposed surfaces on one of said end wall members and said center gland.

11. The assembly of claim 10 further comprising separate liner members lining each of said hydraulic chambers radially inwardly of each of the respective circumferential windings, and seal means between said end wall members and center gland and the opposite ends of said liner members.

12. The assembly of claim 11 further comprising means for removably attaching one of said end wall members at one end of said cylinder to permit removal of said one end wall member therefrom for removal and refurbishment of one of said liner members and replacement of the associated seals, and means for removably attaching said center gland internally within the axial center of said cylinder to permit removal of said center gland and said other liner member for refurbishment and replacement of said other liner member and the associated seals.

13. The assembly of claim 10 wherein there are separate compressive cylinder composite windings between said longitudinal tension windings and each of said circumferential windings, said compressive cylinder composite windings extending axially between opposed surfaces on each of said end wall members and said center gland.

14. The assembly of claim 10 further comprising a center ring surrounding said center gland and secured thereto, said compressive cylinder composite windings extending axially between opposed surfaces on one of said end wall members and said center ring.

15. The assembly of claim 14 further comprising a retaining wire for retaining said center gland within said center ring, said cylinder having a hole extending through the wall thereof to permit said retaining wire to be wound in between said center gland and center ring and removed therefrom to permit removal of said center gland for changing seals and the like.

16. The assembly of claim 14 wherein there are separate compressive cylinder composite windings between said longitudinal tension windings and each of said circumferential windings, said compressive cylinder composite windings extending axialy between opposed surfaces on each of said end wall members and said center gland.

17. The assembly of claim 10 wherein said compressive cylinder composite windings are wound from low angle helical fibers to transmit compressive forces that are reacted into said center gland to the associated end wall member.

18. A composite cylinder assembly comprising a cylinder containing a hydraulic chamber having end wall members at opposite ends thereof, said hydraulic chamber having circumferential hoop stress windings surrounding same, a separate liner member lining said hydraulic chamber radially inwardly of said circumferential windings, seal means between said end wall members and the opposite ends of said liner member, longitudinal tension windings extending substantially the entire length of said cylinder outwardly of said circumferential windings and substantially completely covering said circumferential windings and said hydraulic chamber therebeneath, securing means for securing the opposite ends of said longitudinal tension windings to said end wall members at opposite ends of said cylinder, and compressive cylinder composite windings located between said longitudinal tension windings and said circumferential windings, said compressive cylinder composite windings extending axially between opposed surfaces on said end wall members.

19. The assembly of claim 18 herein said compressive cylinder composite windings are wound from low angle helical fibers to transmit compressive forces that are reacted into one of said end wall members to the other end wall member.

20. A dual tandem composite cylinder assembly comprising a cylinder including a pair of hydraulic chambers in series, said hydraulic chambers having end wall members at the opposite ends of said cylinder and a center gland therebetween, each said hydraulic chamber having separate circumferential hoop stress windings surrounding same, longitudinal tension windings extending substantially the entire length of said cylinder outwardly of said circumferential windings and substantially completely covering said circumferential windings and said hydraulic chambers therebeneath, securing means for securing the opposite ends of said longitudinal tension windings to said end wall members at opposite ends of said cylinder, and attachment means for attaching said center gland to said longitudinal tension windings intermediate the ends of said longitudinal tension windings, said attachment means comprising a center ring surrounding said center gland and secured thereto, and means for attaching said longitudinal tension windings to the exterior surface of said center ring, said center ring having an internal counterbore in each end for receipt of the adjacent ends of said circumferential windings, and each of said end wall members having a radial shoulder for engagement by the opposite end of the respective circumferential windings.

21. A dual tandem composite cylinder assembly comprising a cylinder including a pair of hydraulic chambers in series, said hydraulic chambers having end wall members at the opposite ends of said cylinder and a center gland therebetween, each said hydraulic chamber having separate circumferential hoop stress windings surrounding same, longitudinal tension windings extending substantially the entire length of said cylinder outwardly of said circumferential windings and substantially completely covering said circumferential windings and said hydraulic chambers therebeneath, securing means for securing the opposite ends of said longitudinal tension windings to said end wall members at opposite ends of said cylinder, attachment means for attaching said center gland to said longitudinal tension windings intermediate the ends of said longitudinal tension windings, said attachment means comprising a center ring surrounding said center gland and secured thereto, and means for attaching said longitudinal tension windings to the exterior surface of said center ring, and compressive cylinder composite windings located between said longitudinal tension windings and one of said circumferential windings, said compressive cylinder composite windings extending axially between opposed surfaces on one of said end wall members and said center gland.

22. A dual tandem composite cylinder assembly comprising a cylinder including a pair of hydraulic chambers in series, said hydraulic chambers having end wall members at the opposite ends of said cylinder and a center gland therebetween, said hydraulic chambers having respective separate first and second circumferential hoop stress windings surrounding same, said first circumferential windings extending axially between opposed surfaces on one of said end wall members and one end of said center gland, and said second circumferential windings extending axially between opposed surfaces on the other of said end wall members and the other end of said center gland, longitudinal tension windings extending substantially the entire length of said cylinder outwardly of said first and second circumferential windings and substantially completely covering said first and second circumferential windings and said pair of hydraulic chambers therebeneath, securing means for securing the opposite ends of said longitudinal tension windings to said end wall members at opposite ends of said cylinder, and attachment means for attaching said center gland to said longitudinal tension windings intermediate the ends of said longitudinal tension windings, whereby a hydraulic force acting on said center gland urging said center gland away from one of said end wall members will be transferred to said longitudinal tension windings at the point of attachment of said longitudinal tension windings to said center gland and be reacted back to said one end wall member through said longitudinal tension windings, said attachment means comprising a center ring surrounding said center gland and secured thereto, and means for attaching said longitudinal tension windings to the exterior surface of said center ring.

23. The assembly of claim 22 wherein said center ring has an external tapered surface facing one end of said cylinder which is engaged by said longitudinal tension windings intermediate the ends thereof, and said last mentioned means comprises means for affixing said longitudinal tension windings to said external tapered surface on said center ring.

24. The assembly of claim 23 further comprising separate liner members lining each of said hydraulic cylinders radially inwardly of each of the respective circumferential windings, and seal means between said end wall members and center gland and the opposite ends of said liner members.

25. The assembly of claim 23 further comprising a retaining wire for retaining said center gland within said center ring.

26. The assembly of claim 25 wherein there is a hole in the wall of said cylinder through which said retaining wire is wound between said center gland and center ring and removed therefrom to permit removal of said center gland for changing seals and the like.

27. A dual tandem composite cylinder assembly comprising a cylinder including a pair of hydraulic chambers in series, said hydraulic chambers having end wall members at the opposite ends of said cylinder and a center gland therebetween, said hydraulic chambers having respective separate first and second circumferential hoop stress windings surrounding same, said first circumferential windings extending axially between opposed surfaces on one of said end wall members and one end of said center gland, and said second circumferential windings extending axially between opposed surfaces on the other of said end wall members and the other end of said center gland, longitudinal tension windings extending substantially the entire length of said cylinder outwardly of said first and second circumferential windings and substantially completely covering said first and second circumferential windings and said pair of hydraulic chambers therebeneath, securing means for securing the opposite ends of said longitudinal tension windings to said end wall members at opposite ends of said cylinder, separate liner members lining each of said hydraulic chambers radially inwardly of each of the respective circumferential windings, seal means between said end wall members and center gland and the opposite ends of said liner members, means for removably attaching one of said end wall members at one end of said cylinder to permit removal of said one end wall member therefrom for removal and refurbishment of one of said liner members and replacement of the associated seals, and means for removably attaching said center gland internally within the axial center of said cylinder to permit removal of said center gland and said other liner member for refurbishment and replacement of said other liner member and the associated seals.

* * * * *